United States Patent [19]

Wecker et al.

[11] Patent Number: 4,746,477
[45] Date of Patent: May 24, 1988

[54] PRODUCTION OF PARTIALLY FOAMED EXTRUDED PLASTIC PRODUCTS

[75] Inventors: Sheldon M. Wecker, Libertyville; Lou Kohl, Palatine, both of Ill.

[73] Assignee: James River-Norwalk, Inc., RiverPark, Conn.

[21] Appl. No.: 875,856

[22] Filed: Jun. 18, 1986

[51] Int. Cl.$^4$ ............................ C08J 9/34; C08J 9/12; B29C 47/06; B29C 67/22

[52] U.S. Cl. .................... 264/45.5; 264/45.9; 264/53; 264/171; 264/DIG. 5; 264/DIG. 13; 264/DIG. 14

[58] Field of Search ............... 264/45.9, 46.1, 45.5, 264/DIG. 14, DIG. 5, DIG. 13, 53, 171

[56] References Cited

U.S. PATENT DOCUMENTS

| | | | |
|---|---|---|---|
| 3,956,438 | 5/1976 | Schippers | 264/46.1 |
| 4,410,602 | 10/1983 | Komoda et al. | 264/38 X |
| 4,518,557 | 5/1985 | Wecker | 264/45.9 |

Primary Examiner—Philip Anderson
Attorney, Agent, or Firm—Cooper & Dunham

[57] ABSTRACT

In a method of extruding a plastic product having a foamed core layer and at least one unfoamed skin layer by forcing contiguous flows of a resin through a coextrusion die, one of the flows containing a blowing agent and a nucleating agent for forming the core layer and the second of the flows containing only the blowing agent, for forming the skin layer, the steps of establishing a fluent stream of resin containing the blowing agent, dividing the stream into separate streams which are separately conducted to the coextrusion die to constitute the core-forming and skin-forming flows, respectively, and selectively adding the nucleating agent only to that one of the separate streams which constitutes the core-forming flow. The nucleating agent used can be one which is effectively completely expended when the core layer foams, so that the foamed product is essentially free of active nucleating agent.

15 Claims, 1 Drawing Sheet

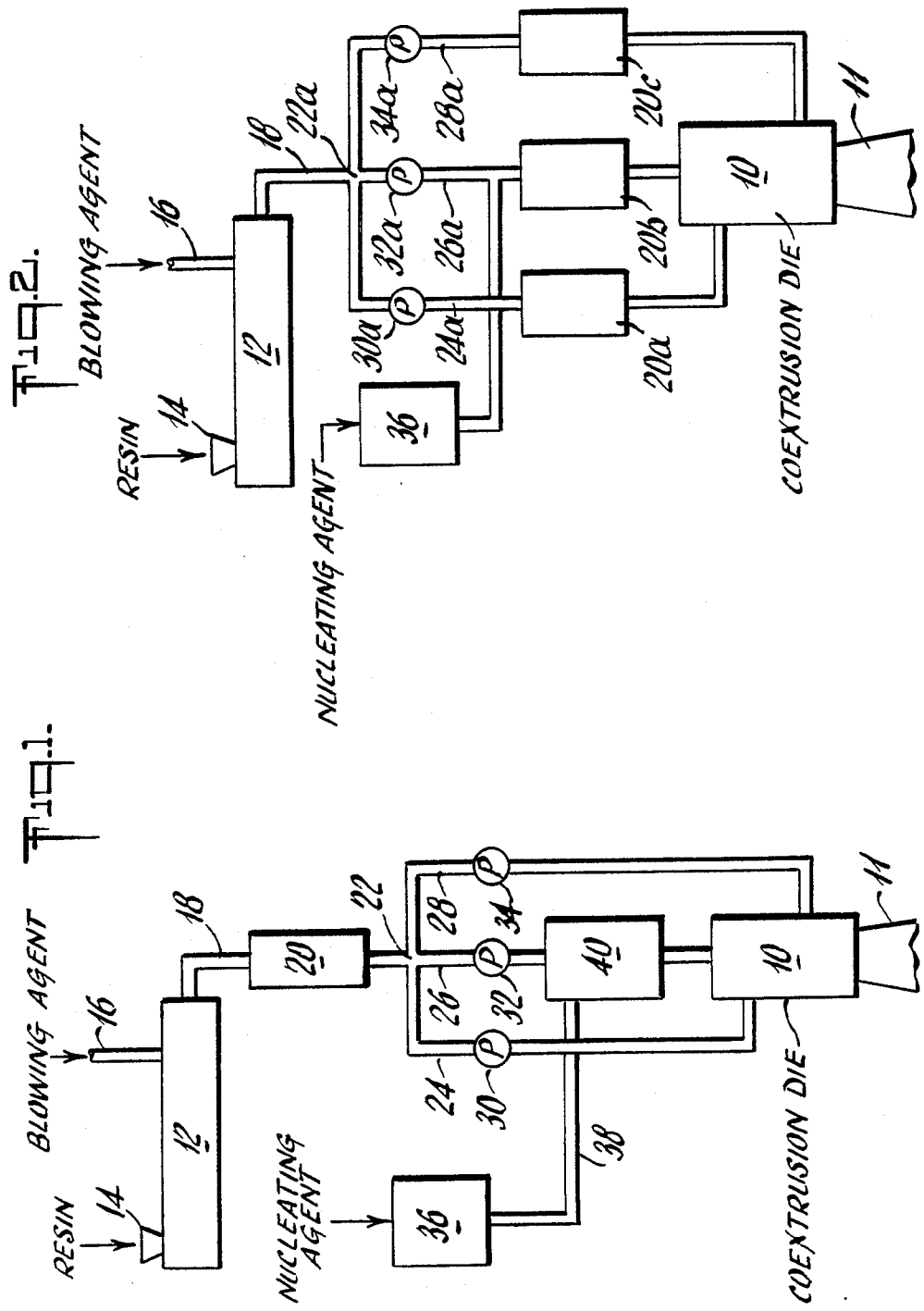

PRODUCTION OF PARTIALLY FOAMED EXTRUDED PLASTIC PRODUCTS

BACKGROUND OF THE INVENTION

This invention relates to methods of making partially foamed extruded plastic products, viz. products having a foamed core layer of resin and a substantially unfoamed skin layer contiguous and bonded thereto.

One illustrative use of the present method is in producing multilayer sheet plastic stock for making disposable dinner plates and the like. The stock has a central core layer of foamed or expanded resin sandwiched between and bonded to unexpanded thin skin layers of resin, the foamed core layer importing desired bulk to the product while the skin layers protect the core against surface abrasion and cutting, contribute to product stiffness, and provide an attractive surface appearance.

Conveniently, the stock is produced by coextruding the three layers as concentric strata of a tube or hollow cylindrical sleeve which is slit into sheets beyond the coextrusion die. Coextrusion is accomplished by forcing concurrent, contiguous, concentric flows (skin/core/skin) of resin in a fluent, extrudable state, herein termed a melt, through an annular orifice defined between a circular die aperture and a cylindrical mandrel surface. The core-forming flow has a foamable composition, so as to expand into a predominantly closed cellular structure after release from the pressure within the die at the temperature at which extrusion occurs, and the skin-forming flows are at least substantially nonfoamable, such that the skin layers after extrusion have a relatively dense, noncellular structure. Ultimately, the produced sheet stock is cut into plates or other desired articles, leaving a substantial amount of scrap which is advantageously recycled to constitute a supply of resin for re-extrusion to produce further sheet stock.

A foamed structure of extruded thermoplastic resin is produced by incorporating in the resin a suitable proportion of a blowing agent which, at a sufficiently elevated temperature and at atmospheric pressure, provides gas for creating a multiplicity of cells or voids that expand the resin layer or body into a foam that stabilizes upon subsequent cooling. The blowing agent may be a chemical agent, which decomposes when heated to produce the foam-creating gas, or a physical agent (e.g. a hydrocarbon, such as butane or pentane), which undergoes a phase change from liquid to gas when heated. Physical blowing agents, in general, are capable of providing a much greater reduction in density of a resin layer or body than are chemical blowing agents. Typically, a physical blowing agent is employed in conjunction with a nucleating agent, dispersed through the body or layer of resin to be foamed; when the resin, advancing through an extrusion die at elevated temperature and pressure, is released to atmospheric pressure by emergence from the die, the liquid blowing agent vaporizes and forms gas bubbles at the nucleating sites provided by the dispersed nucleating agent to create the desired foamed structure of voids or cells throughout the resin.

Various systems and procedures are known for incorporating blowing and nucleating agents in a resin melt. U.S. Pat. No. 3,787,542, for instance, describes a procedure in which a resin melt is divided into plural streams to facilitate mixing; a first blowing agent is added to all the streams; a second blowing agent, which serves as a nucleating agent for the first blowing agent, is then added to all the streams; and the streams are recombined for extrusion through a die. In another, conventional foam extrusion process, resin pellets are mixed with a nucleating agent and melted in a heating extruder in which the plastic and nucleating agent are held under high temperature and pressure; to the pressurized melt is added a liquid physical blowing agent, which acts as a plasticizer, reducing the melt viscosity and lowering the level of temperature necessary to maintain the hot melt condition of the mixture of plastic and nucleating agent. This mixture, with the blowing agent added, is cooled to an extrusion temperature suitable for foaming, and extruded through a die, becoming foamed upon vaporization of the blowing agent when released to atmospheric pressure beyond the die. One particular system uses polystyrene as the plastic, pentane as the blowing agent, and a mixture of citric acid and sodium bicarbonate as the nucleating agent.

The systems and procedures just mentioned are employed for production of articles having a single, uniformly foamed layer. To make a product having a foamed core layer and an unfoamed skin layer or layers in a coextrusion die, it has heretofore been proposed to employ the same resin in both the core-forming and the skin-forming flows in the die and to incorporate a blowing agent only in the core-forming flow. For example, U.S. Pat. Nos. 3,782,870 and 3,956,438 describe procedures wherein a resin melt is established in a heating extruder which divides the melt into two streams, for advance to a coextrusion die, and adds a blowing agent to only one of these streams. Owing, however, to the viscosity-lowering effect of physical blowing agents, the contiguous flows of resin in the die (one flow containing, and the other lacking, a blowing agent), though both constituted of the same resin, differ from each other in viscosity; and this difference in viscosity tends to cause flow instability and undesired mixing of the core-forming and skin-forming flows within the die. The effects of viscosity mismatch in a coextrusion die can be mitigated, in a coextrusion die system wherein only the core-forming flow contains a blowing agent, by using different resins for the core-forming and skin-forming flows respectively, with the skin-forming resin selected to have an inherently lower viscosity than the core-forming resin; but the lower-viscosity resins tend to have inferior physical peroperties (e.g. brittleness), and in addition, the presence of layers of two different resins (with respectively different viscosities) in the extruded product hinders or prevents recycling of product scrap as a source of resin for either layer.

Some other proposals for making extruded plastic products with contiguous foamed and unfoamed layers, while using the same resin for both layers, have involved physically separated rather than contiguous flows of core-forming and skin-forming melts, and have thus necessitated use of special equipment characterized by undesirable structural and/or operational complexity as compared with ordinary coextrusion dies.

A solution to many of the foregoing difficulties is provided by the method described and claimed in U.S. Pat. No. 4,518,557, issued May 21, 1985, to Sheldon M. Wecker, one of the applicants herein. In this method, the same resin is used for both the core-forming and skin-forming flows, which are advanced contiguously through a coextrusion die, and all flows contain the same blowing agent; the blowing agent in the skin-forming flow or flows acts as a plasticizer so that the viscosity of such flow or flows is comparable to that of the core-forming flow. Foaming action is restricted to the core layer by incorporating a nucleating agent only in the core-forming melt (the skin-forming melt being thus at least substantially free of nucleating agent), and extruding at a temperature at which the blowing agent causes foaming only in the presence of a nucleating agent. As the patent explains, for various blowing agents (especially physical blowing agents), there is a range of temperatures at which the blowing agent will cause foaming if but only if a nucleating agent is present, although at higher temperatures the blowing agent will cause foaming even without a nucleating agent. Consequently, by appropriate mutual selection of blowing agent, nucleating agent and extrusion temperature, the presence of nucleating agent only in the core layer (and not in the skin layer or layers) will produce foaming action restricted to the core layer notwithstanding that the blowing agent is present in both core and skin.

In specific embodiments of the method of the last-mentioned patent, as therein described, the core-forming melt is prepared by supplying resin and nucleating agent to the hopper of a first heating extruder with introduction of a blowing agent (e.g. pentane) at a downstream locality therein, and the skin-forming melt is prepared by supplying resin without nucleating agent to the hopper of a second heating extruder, again with introduction of blowing agent at a downstream locality therein. Thus, two separate heating extruders are used, from which the respective melts are separately advanced to a coextrusion die where they are brought together in contiguous flows.

SUMMARY OF THE INVENTION

The present invention is directed to improvements in methods of making an extruded plastic product having a foamed core layer and a substantially unfoamed skin layer contiguous and bonded thereto, by forcing contiguous concurrent flows of a resin in a fluent, extrudable state to and through a coextrusion die at a predetermined temperature for respectively forming the core and skin layers, wherein the core-forming flow comprises a resin containing a blowing agent and a nucleating agent in proportions effective to cause foaming of the core layer and the skin-forming flow comprises the same resin containing the same blowing agent but at least substantially free of any nucleating agent, and wherein the blowing agent, the nucleating agent, and the predetermine extruding temperature are mutually selected so that foaming occurs in the core layer, and the skin layer remains at least substantially unfoamed, downstream of the die, these methods being of the general type described in the aforementioned U.S. Pat. No. 4,518,557.

Stated broadly, the invention contemplates the combination, in such a method, of the steps of establishing an advancing stream of the resin in fluent state having the blowing agent incorporated therein in a proportion as aforesaid, and dividing the advancing stream into separate streams and separately conducting the separate streams to the coextrusion die to respectively constitute the core-forming flow and the skin-forming flow therein, while selectively adding the nucleating agent, in a proportion as aforesaid, only to that one of the separate streams which constitutes the core-forming flow.

The method of the invention (wherein a single stream of resin melt containing blowing agent is prepared and divided, and the nucleating agent is selectively added thereafter only to the core-forming one of the separate streams) affords significant advantages over procedures in which the core-forming melt and the skin-forming melt are respectively initially prepared in separate heating extruders, with nucleating agent incorporated in the core-forming melt in its heating extruder before addition of blowing agent. In particular, the present method enables the entire melt for both core and skin layers to be prepared, and supplied with blowing agent, in a single heating extruder, thereby reducing to one the number of heating extruder, required, with resultant saving in equipment costs. Also, such use of a single heating extruder enables the heating extruder to be operated at full capacity at all skin-to-core weight ratios, thereby optimizing economical equipment utilization, whereas when separate heating extruders are required to prepare the core and skin melts, both extruders can operate at full capacity only at a single skin-to-core weight ratio. Economics of size are realized by employing a single relatively large heating extruder rather than plural smaller heating extruders. Additionally, the introduction of the nucleating agent downstream of the heating extruder reduces the time lag between occurrence and detection of changes in level of nucleating agent, thereby facilitating control of product core layer cell size and enabling product changes to be effected with enhanced rapidity.

As a further particular feature of the invention, in currently preferred embodiments thereof, a nucleating agent is used which is effectively completely expended (viz. dissipated and/or inactivated) during foaming of the core layer downstream of the die such that the product is essentially free of active nucleating agent. Thus, product scrap can be recycled for use as a resin supply in preparing fresh quantities of melt in the single heating extruder for both core and skin layers without introducing active nucleating agent (i.e. an agent providing nucleation sites for formation of foam-creating gas bubbles by the blowing agent) to the skin layer of the subsequently extruded product. The nucleating agent may, in such case, be a material that is activated (to provide nucleation sites) by the presence of a coagent which is also incorporated at least in the core-forming melt and is itself not effective as a nucleating agent for the blowing agent used, so that even if the coagent is not expended during foaming but is instead introduced to the skin layer by recycling of product scrap, foaming of the skin layer does not occur.

In a specific aspect, the invention particularly contemplates the use of physical blowing agents, both because of the high degree of expansion afforded by such blowing agents and because the problems overcome by selective inclusion of nucleating agent only in the core-forming melt stream are particularly severe when physical blowing agents are employed. That is to say, the advantages of the invention are especially important in procedures utilizing physical blowing agents. Again, while a wide variety of thermoplastic polymers may be utilized as the resin in the melt for forming both core and skin layers, a currently preferred resin is polystyrene. One physical blowing agent usable therewith is pentane, added in liquid state to the resin melt and vaporizing upon release of the extruded core layer to atmospheric pressure, at the extrusion temperature, as the extruded product emerges from the die. For a polystyrene-penetane system, one suitable nucleating agent is carbon dioxide, activated by a coagent such as water or a powdered solid, e.g. powdered citric acid; such nucleating agent is effectively completely expended during forming of the core layer, facilitating recycling of product scrap.

As already indicated, the initial common stream of resin melt is prepared by heating and working action in a single heating extruder, to which the resin is supplied e.g. in pellet form for conversion to a fluent melt, and in which the blowing agent is blended, the extruder advancing the resultant melt stream along a defined path at a first elevated temperature. In common with conventional foam extrusion operations, the melt is then cooled to a second, lower but still elevated temperature by advance through a cooling region (e.g. a cooling extruder, acting as or associated with a heat exchanger) intermediate the heating extruder and the coextrusion die. The step of dividing the advancing melt stream into separate streams may be performed downstream of the cooling region, with subsequent addition and blending of nucleating agent in that one of the separate streams which constitutes the core-forming flow. Alternatively, and in at least some instances preferably, the initial stream can be divided into the separate streams between the single heating extruder and the cooling region, which then comprises a cooling zone for each separate stream; and the addition and blending of nucleating agent in the core-forming separate stream can be performed in the cooling zone provided for the latter separate stream, such cooling zone being, for example, a cooling extruder.

For many purposes, a preferred partially foamed extruded product comprises a foamed core layer sandwiched between two substantially unfoamed skin layers. As embodied in methods of producing such a product, by forcing a core-forming melt flow and two skin-forming melt flows to and through a coextrusion die, the invention contemplates dividing the initial advancing stream (containing blowing agent) into three separate streams for respectively constituting the three flows and selectively adding nucleating agent only to that one of the separate streams which constitutes the core-forming flow.

Further features and advantages of the invention will be apparent from the detailed description hereinbelow set forth, together with the accompanying drawing.

BRIEF DESCRIPTION OF THE DRAWING

FIG. 1 is a highly simplified diagrammatic view of an extrusion system arranged for practice of the method of the invention in an illustrative embodiment; and FIG. 2 is a similar view of another extrusion system, arranged for practice or a second embodiment of the present method.

DETAILED DESCRIPTION

For purposes of illustration, the invention will be described as embodied in procedures for producing a plastic sheet product having a foamed core layer sandwiched between unfoamed protective skin layers, by extrusion of the sheet in a coextrusion die as a hollow tube or sleeve which is subsequently slit longitudinally, e.g. prior to cutting of the sheet to form articles such as disposable dinner plates and the like.

The coextrusion die may be of a known, generally conventional type with an annular outlet or die orifice defined between a circular aperture in a die block and a cylindrical mandrel. Upstream of the die block, the coextrusion die includes a feedblock portion defining a generally annular feed passage leading to the die orifice, and providing inlets for separately admitting three melt streams of resin to the feed passage, in such manner that the three streams respectively constitute three contiguous but discrete concentric flows advancing concurrently along the feed passage to and through the die orifice. The three flows, forced under elevated pressure through the feed passage and die orifice, and maintained at a predetermined elevated temperature such that the resin of each stream is in a fluent continuous phase, respectively form the inner skin layer, the central core layer, and the outer skin layer of the tube or sleeve emerging from the die orifice. It will therefore be understood that the core-forming flow is the central one, and the two skin-forming flows are respectively the inner and outer ones, of the three concentric contiguous flows advancing through the feed passage. In the product sheet the skin layers are contiguous to, and bonded to, opposite surfaces of the core layer with which they are thus coextruded.

As in a process described in the aforementioned U.S. Pat. No. 4,518,557, the same thermoplastic resin is used in all three streams or flows, and all three also contain a minor proportion of a blowing agent, typically a physical blowing agent which is introduced in liquid state and which vaporizes upon emergence of the extruded tube or sleeve from the coextrusion die orifice (i.e. as the extruded layers are released to atmospheric pressure from the elevated-pressure conditions obtaining within and upstream of the die feed passage), at the aforementioned predetermined elevated temperature, at which extrusion occurs. The core-forming stream or flow of resin also contains a minor proportion of a nucleating agent, uniformly dispersed therein, to provide nucleating sites for causing foaming action of the blowing agent. The skin-forming streams or flows, however, are at least substantially free of active nucleating agent. The blowing agent and the nucleating agent, and their proportions in the core-forming flow, are mutually selected such that there exists a range of elevated temperatures (sufficiently high that the resin employed is in fluent continuous phase) at which the blowing agent produces effective foaming action (at atmospheric pressure) in the presence of the nucleating agent, but not in the absence of the nucleating agent, although at temperatures above this range the blowing agent may produce foaming action even without any nucleating agent. Further, the predetermined extrusion temperature is selected within the just-mentioned range; hence, after emergence from the die orifice, the core layer of the extruded tube or sleeve foams (i.e. expands through the coaction of the blowing and nucleating agents both present in the core, into a relatively low-density structure of cells or voids) but the skin layers do not foam, remaining instead relatively dense, because they lack the nucleating agent.

Conveniently, in the practice of the present method, a resin melt is established and mixed with blowing agent in a first, heating extruder having a rotary screw and a surrounding barrel with an inlet hopper adjacent one end, an outlet opening at the other end, and means for heating material being advanced and worked within the barrel by the screw. A thermoplastic resin, e.g. in pellet form, is supplied to the extruder hopper in a continuous or incremental feed at a rate sufficient to maintain a continuous discharge of resin melt through the extruder outlet. The screw works the resin and advances it along the barrel, while the heating means elevates the resin temperature, to convert the initially pelletized resin feed into a continuous fluent or molten phase. At a downstream locality in the barrel, a liquid physical blowing agent is added to the extruder through a side port in the barrel and is thoroughly blended with the resin melt by the action of the portion of the screw beyond (downstream of) the port.

The resin melt containing the blowing agent is discharged from the heating extruder as a continuous stream, advancing along a path defined by suitable conduit structure, at an elevated temperature and pressure imparted to the stream by the extruder. This initial elevated temperature, required to melt the resin in the extruder barrel before addition of the blowing agent (which acts as a plasticizer for the resin), is somewhat higher than that needed or desired for extrusion of the product through the coextrusion die orifice. Accordingly, the melt is advanced from the heating extruder through cooling means (such as a second, cooling extruder having a barrel provided with cooling zones) for reducing the temperatur of the melt to the aforementioned predetermined extrusion temperature, and thence is further advanced to the coextrusion die, as a continuously flowing stream under the requisite extrusion pressure.

Such a system and procedure for preparing and delivering a foamable resin melt to an extrusion die are, in a broad sense, already known. However, where a nucleating agent has been incorporated in the melt, it has heretofore been conventional to supply the nucleating agent together with the resin pellets to the inlet hopper of the first, heating extruder, i.e. upstream of the locality of introduction of the blowing agent. Thus, for coextrusion of two or more contiguous layer-forming resin flows all of which contains a blowing agent but only one of which contains a nucleating agent, it has been customary to provide two initially separate resin melts, respectively established in separate heating extruders, with nucleating agent supplied to the hopper of only one of the heating extruders.

In contrast, in the method of the present invention, and as particular features thereof, a single heating extruder is used to establish a single resin melt and to add and blend the blowing agent into the melt; the continuous melt stream flowing from this heating extruder is divided into a plurality of separate streams at a locality intermediate the heating extruder and the coextrusion die, and these separate streams are separately conducted to the coextrusion die so as to constitute, respectively, the core-forming and skin-forming flows therein; and the nucleating agent is selectively added only to that one of the separate streams which constitutes the core-forming flow. The nucleating agent is added to the latter stream at a point intermediate the locality where the single initial stream is divided and the coextrusion die, and is blended in the melt of that stream so as to become uniformly dispersed therein.

Referring now to FIG. 1, there is shown an extrusion system including a coextrusion die 10 for producing an extruded sheet plastic product in the form of a tube or sleeve 11 comprising three concentric contiguous layers, bonded together, of which the central layer is a foamed core layer and the outer layers are at least substantially unfoamed skin layers. At the upstream end of the system, a heating extruder 12 (e.g. a generally conventional screw extruder having suitable means, not shown, for heating the extruder barrel) establishes a fluent melt of resin, the resin being initially charged to the inlet hopper 14 of the extruder in pelletized or other convenient form. A physical blowing agent in liquid state is delivered to the interior of the extruder barrel through a conduit 16 at a point downstream of the inlet hopper, for thorough blending with the resin melt by the action of the extruder screw (not shown).

The melt containing blowing agent is discharged from the outlet end of the extruder 12, under high pressure and at a first elevated temperature, through a conduit 18 which delivers the melt to a cooling extruder 20 where the melt is cooled to a second, predetermined elevated temperature lower than the first elevated temperature but still sufficiently high to maintain the resin-blowing agent mixture in a continuous fluent (molten) phase. At a locality 22 beyond the outlet of the cooling extruder, the continuous melt stream is divided into three separate streams, respectively conveyed in conduits 24, 26, and 28, for separate delivery to the coextrusion die 10. For assured advance of melt under constant elevated pressure, the three conduits 24, 26 and 28 are respectively provided with melt pumps 30, 32 and 34.

The separate streams advancing in conduits 24 and 28 respectively constitute the two skin-forming flows of melt in the die 10, and are delivered by conduits 24 and 28 under positive pressure to the die feed passage at localities appropriate for establishing those flows. The separate stream advancing in conduit 26 is delivered to the die 10 at such location as to constitute the core-forming flow. In accordance with the invention, a nucleating agent is introduced to this latter stream (in conduit 26) intermediate the locality 22 and the die, being supplied to conduit 26 by a liquid nucleat pump 36 which delivers the nucleating agent along a line 38 to a static mixer 40, through which the stream in conduit 26 passes before reaching the die 10; the static mixer effects thorough blending of nucleating agent in the die, to achieve a uniform dispersion as the melt stream is advanced therethrough (and onwardly to the die 10) under positive pressure by the pump 32. Consequently, notwithstanding that all three flows (skin/core/skin) in the die 10 derive from a common resin melt-blowing agent mixture established in and forwarded from a single heating extruder, only the core-forming flow contains nucleating agent and thus only the core layer foams upon extrusion from the die at the aforementioned predetermined extrusion temperature.

FIG. 2 represents an alternative embodiment of the method of the invention in which, again, a resin melt is established in a heating extruder 12, blended with a liquid physical blowing agent (introduced through conduit 16) therein, and impelled as a fluent stream of resin-blowing agent mixture along a conduit 18 by the action of the heating extruder screw for subsequent division into three separate melt streams, cooling to a predetermined extrusion temperature, and delivery of the three streams separately to a coextrusion die 10 to respectively constitute a core-forming flow and inner and outer skin-forming flows in the die feed passage, with nucleating agent added only to that one of the separate streams that constitutes the core-forming flow. In the embodiment of FIG. 2, the division of the initial melt stream into three separate streams (respectively conveyed to the die by conduits 24a, 26a, and 28a) is performed at a locality 22a intermediate the heating extruder 12 and the region at which the melt is cooled, in the path of melt advance. Thus, separate cooling means 20a, 20b, and 20c (e.g. cooling extruders or heat exchangers) are respectively provided in the lines of conduits 24a, 26a, and 28a intermediate the locality 22a and the coextrusion die 10. As in the system of FIG. 1, melt pumps 30a, 32a, and 34a are also respectively associated with the conduits 24a, 26a and 28a for advancing the three separate melt streams under positive pressure to the die.

A nucleating agent is delivered by a liquid nucleant pump 36 along line 38a to the conduit 26a (which conveys the separate melt stream that constitutes the core-forming flow in the die 10) at a point between the locality 22a and the cooling means 20b associated with conduit 26a. This latter cooling means is conveniently a cooling extruder, which (in addition to reducing the temperature of the melt stream in conduit 26a) provides mixing action for uniformly dispersing the nucleating agent in the core-forming melt stream. This arrangement obviates the provision of the separate static mixer 40 which is included in FIG. 1. The embodiment of FIG. 2 is in other respects generally similar to that of FIG. 1, i.e. being characterized by continuous advance of the three separate melt streams under positive pressure and at a predetermined elevated temperature to the die 10 for continuous extrusion of a three-layer (unfoamed skin/foamed core/unfoamed skin) plastic sheet product 11 in the form of a tube or sleeve.

In the foregoing procedures, various operating conditions (e.g. selection of materials used as the resin and blowing agent, proportion of blowing agent, temperatures employed, etc.) may be generally as set forth in U.S. Pat. No. 4,518,557. Broadly stated, any thermoplastic polymeric material capable of being extruded and foamed with a blowing agent in the presence of a nucleating agent can be used as the resin in the method of the invention; polystyrene is currently preferred as the resin, owing to its commercial importance as the material of choice for articles of types made by the present method in the described embodiments. The blowing agent can be any substance which is compatible with the resin, and which provides effective foaming action in the presence (but not in the absence) of a nucleating agent through a range of temperature at which the resin is in a fluent, extrudable phase. It is especially preferred to use a physical blowing agent, e.g. a hydrocarbon which is supplied to the resin melt in liquid state, and which vaporizes upon release of the extruded resin (containing the blowing agent) to atmospheric pressure beyond the die, at the extrusion temperature; one suitable blowing agent of this character, currently preferred for use with polystyrene resin, is pentane.

Additional substances (e.g. colorants), if desired, can be incorporated in one or more of the melt streams ahead of the coextrusion die 10, for instance at the static mixer 40 of FIG. 1 or at the cooling extruder 20b of FIG. 2. Also, it will be appreciated that while the described three-layer product is currently preferred for many purposes, a two-layer (foamed core/unfoamed skin) product, or a product having more than three layers (including at least one foamed, and at least one unfoamed layer) can be produced by the present method, by employing a coextrusion die arranged to extrude such a product and dividing the initial single melt stream into an appropriate plurality of separate streams, with nucleating agent added only to the stream or streams which is or are to form a foamed layer or layers.

Further particular features of the invention, in important specific aspects, reside in the selection of the nucleating agent used in the method. While a satisfactory product can be produced with any nucleating agent that coacts with the blowing agent in the manner described above, it is particularly advantageous to employ a nucleating agent that becomes effectively completely expended during foaming of the core layer downstream of the die, i.e. such that the final extruded product is essentially free of active nucleating agent. In this way, product scrap (remaining after articles such as plates are cut from the product sheet) can be recycled to the initial heating extruder for re-use as a source of resin therein, without undesirably introducing active nucleating agent to those portions of the melt that are ultimately delivered to the die 10 as skin-forming streams or flows. For instance, if talc were used as the nucleating agent, it would not be possible to recycle product scrap to the extruder 12 in the system of FIG. 1 or FIG. 2 because the talc content of the scrap remains an active nucleating agent and would ultimately be present in the skin layers of the product, thereby defeating the objective of achieving selective foaming of only the core layer.

The nucleating agent preferably used in the invention (i.e. an agent that becomes effectively completely expended during foaming, as mentioned above) may be one which is activated by the presence of a coagent that is itself not effective as a nucleating agent for the blowing agent employed. One specific example is $CO_2$ (nucleating agent) with water as a coagent, or with a powdered coagent (e.g. powdered citric acid) that is not itself effective as a nucleating agent for the blowing agent. $CO_2$ offers the additional advantage of itself directly contributing to the blowing or foaming of the core layer. If a $CO_2$-water nucleating agent-coagent system is used, the $CO_2$ and water are added together from the nucleant pump 36; neither $CO_2$ nor water leaves any residue in product scrap. If the coagent used with the $CO_2$ is a powder such as citric acid that does not itself provide nucleation sites, the powder can be added with the resin in the hopper 14 of the initial heating extruder. In the latter case, even though powdered citric acid is present in the skin-forming flows in the die 10, and is recycled in product scrap to the extruder 12, it does not cause foaming of the skin layer of the product because it is not itself effective as a nucleant, and $CO_2$ is introduced only to the core-forming melt stream. Another powdered coagent for $CO_2$ is a mixture of citric acid and sodium bicarbonate.

In experimental evaluations of the efficacy of $CO_2$ as a nucleating agent, proportions of $CO_2$ up to about 5% by weight of the melt stream (polystyrene containing pentane) to which it is added, in the presence of water as a coagent, have produced low density coarse celled foam. Best results were obtained with 1-2% weight $CO_2$ and 0.5% by weight citric acid powder added to the pentane-containing polystyrene melt stream (properties based on the total melt stream). The powder nucleated the $CO_2$ which in turn formed sites for pentane growth, producing a foamed structure; but in tests where powdered citric acid was present without any $CO_2$, there was no foaming. When $CO_2$ is used as the nucleating agent, it is necessary to maintain the pressure of the melt flows in and ahead of the die sufficiently high to prevent premature foaming, as will be readily apparent to persons of ordinary skill in the art.

It is to be understood that the invention is not limited to the procedures and embodiments hereinabove specifically set forth, but may be carried out in other ways without departure from its spirit.

We claim:

1. In a method of making an extruded plastic product having a foamed core layer and a substantially unfoamed skin layer contiguous and bonded thereto, by forcing contiguous concurrent flows of a resin in a fluent extrudable state to and through a coextrusion die at a predetermined temperature for respectively forming said core and skin layers, wherein the core-forming flow comprises a resin containing a blowing agent and a nucleating agent in proportions effective to cause foaming of the core layer and the skin-forming flow comprises said resin containing said blowing agent but at last substantially free of any nucleating agent, and wherein said blowing agent, said nucleating agent, and said temperature are mutually selected such that foaming occurs in the core layer and the skin layer remains at least substantially unfoamed downstream of the die, the improvement which comprises the combination of steps of
   (a) establishing an advancing stream of the resin in fluent state having the blowing agent incorporated therein in a proportion as aforesaid, and
   (b) dividing the advancing stream into separate streams and separately conducting the separate streams to the coextrusion die to respectively constitute the core-forming flow and the skin-forming flow therein, while
   (c) selectively adding the nucleating agent, in a proportion as aforesaid, only to that one of the separate streams which constitutes the core-forming flow.

2. A method according to claim 1 wherein the establishing step comprises heating the resin to a first elevated temperature in a first extruder, blending the blowing agent therewith in the first extruder, and impelling the resin in fluent condition containing the blowing agent along a defined path by action of the first extruder; and further including the step of cooling the resin containing the blowing agent to a second elevated temperature lower than the first elevated temperature by advancing the resin containing the blowing agent through a cooling region intermediate the first extruder and the coextrusion die.

3. A method according to claim 2 wherein the dividing step is performed at a locality between the cooling region and the coextrusion die, in the path of advance of the stream from the first extruder toward the coextrusion die; and wherein the adding step includes blending the nucleating agent with the separate stream to which it is added, intermediate the last-mentioned locality and the coextrusion die.

4. A method according to claim 2 wherein the dividing step is performed at a locality between the first extruder and the cooling region, wherein the cooling region comprises a separate cooling zone for each of the separate streams, and wherein the adding step includes blending the nucleating agent with the separate stream to which it is added, in the cooling zone through which the last-mentioned separate stream is advanced.

5. A method according to claim 1 wherein said blowing agent is a physical blowing agent.

6. A method according to claim 1 wherein said nucleating agent is effectively completely expended during foaming of the core layer downstream of the die such that the product is essentially free of active nucleating agent.

7. A method according to claim 6 including the steps of forming portions of the product into articles, recovering other portions of the product as scrap, and recycling the scrap as a supply of resin for the establishing step.

8. A method according to claim 6 wherein said nucleating agent is activated by the presence of a coagent which is itself not effective as a nucleating agent for said blowing agent, said coagent being incorporated at least in that one of the separate streams which constitutes the core-forming flow.

9. A method according to claim 8 wherein the nucleating agent is carbon dioxide and the coagent is water, and wherein the coagent is added with the nucleating agent to the last-mentioned separate stream.

10. A method according to claim 8 wherein the nucleating agent is carbon dioxide and the coagent is a powdered solid.

11. A method according to claim 8 wherein the resin is polystyrene, the blowing agent is pentane, and the nucleating agent is carbon dioxide.

12. A method according to claim 6 wherein the blowing agent is a physical blowing agent.

13. A method according to claim 12 wherein the resin is polystyrene and the blowing agent is pentane.

14. A method according to claim 1 wherein the resin is polystyrene.

15. A method according to claim 1 for producing a product having said core layer sandwiched between and bonded to two contiguous unfoamed skin layers, wherein three contiguous concurrent flows of said resin are forced to and through said die, one of said flows being the core-forming flow, a second of said flows being the skin-forming flow, and the third of said flows being another skin-forming flow identical in composition and properties to said second flow, said second and third flows being respectively located on the opposite sides of the core-forming flow; and wherein the dividing step comprises dividing the advancing stream into three separate streams for respectively constituting said three flows.

* * * * *